(12) United States Patent
Choi

(10) Patent No.: US 9,242,605 B1
(45) Date of Patent: Jan. 26, 2016

(54) VEHICLE SIDE REAR-VIEW MIRROR ASSEMBLY HAVING MEANS FOR EXPOSING BLIND SPOT

(71) Applicant: Oscar Yonghwan Choi, Los Angeles, CA (US)

(72) Inventor: Oscar Yonghwan Choi, Los Angeles, CA (US)

( * ) Notice: Subject to any disclaimer, the term of this patent is extended or adjusted under 35 U.S.C. 154(b) by 0 days.

(21) Appl. No.: 14/595,137

(22) Filed: Jan. 12, 2015

(51) Int. Cl.
*G02B 7/182* (2006.01)
*B60R 1/00* (2006.01)
*B60R 1/08* (2006.01)

(52) U.S. Cl.
CPC ................. *B60R 1/007* (2013.01); *B60R 1/081* (2013.01)

(58) Field of Classification Search
CPC .......... B60R 1/07; B60R 1/064; B60R 1/066; B60R 1/007
USPC .................. 359/843, 877, 871, 872, 873, 876
See application file for complete search history.

(56) References Cited

U.S. PATENT DOCUMENTS

| | | | |
|---|---|---|---|
| 6,485,155 B1 * | 11/2002 | Duroux | B60R 1/07 359/843 |
| 7,748,857 B2 * | 7/2010 | Fimeri | B60R 1/07 359/877 |

* cited by examiner

*Primary Examiner* — Euncha Cherry
(74) *Attorney, Agent, or Firm* — East West Law Group; Heedong Chae

(57) ABSTRACT

A vehicle side rear-view mirror assembly having a means for exposing a blind spot includes a mirror housing, a support frame, a backing plate, a mirror glass; a connecting means which connects the mirror glass to the backing plate such that the mirror glass is pivoted on the connecting means about a rotating axis. A motion actuator rotates the mirror glass about the rotating axis. The assembly further includes adjustment means to adjust the predetermined position of the mirror glass, which includes a motion height adjustment means to adjust the height of the motion actuator, and a rotating axis defining member which can be rotated by a rotating means independently of the backing plate and the mirror glass. A switch is installed on a steering wheel to activate the motion actuator, the switch having two conductive wires which can be connected by a conductive metal piece.

20 Claims, 15 Drawing Sheets

VEHICLE SIDE REAR-VIEW MIRROR ASSEMBLY HAVING MEANS FOR EXPOSING BLIND SPOT

CROSS-REFERENCE TO RELATED APPLICATIONS

The present application is a continuation-in-part of Ser. No. 14/132,806, filed Dec. 18, 2013.

STATEMENT REGARDING FEDERALLY SPONSORED RESEARCH OR DEVELOPMENT

Not Applicable

FIELD OF THE INVENTION

The present invention relates to a side rear-view mirror assembly of a vehicle and, more particularly, to a vehicle side rear-view mirror assembly having a means for exposing a blind spot. The assembly includes a motion actuator to quickly rotate the mirror glass to expose a blind spot so that a driver can view the blind spot through the mirror glass. The motion actuator rotates the mirror glass about a rotating axis in order for the mirror glass to rotate from a normal position to a predetermined position. The assembly further includes a structure to adjust the predetermined position as a driver wishes. The normal position can be adjusted by using a conventional rear view rotating means.

BACKGROUND OF THE INVENTION

While driving a vehicle, a driver must constantly review his surroundings to avoid a collision. Side rear-view mirrors assist a driver in reviewing the surroundings generally disposed behind the driver without the driver having to turn his head more than necessary.

Blind spots exist on either side of the vehicle. Blind spots are spaces that are not visible to the driver through the rear-view mirrors and the driver must turn his head to view the blind spots.

Customarily, the side rear-view mirrors are provided with means for adjusting the orientation of the mirrors. For an electrically powered adjustment, two electric motors are generally provided, one for adjusting the orientation about a vertical axis and the other for adjusting the orientation about a horizontal axis.

However, these adjusting devices are not suitable for a driver to use for exposing blind spots while driving because the devices rotate the mirrors slowly and using such devices while driving can be very dangerous.

Various means for exposing blind spots by rotating the side rear-view mirrors from a normal position to a predetermined position have been introduced, but they operate rather slowly and lack mechanism to avoid interference between such means and the existing adjusting devices. To be effective, the blind spot exposing means should work very fast. A means for exposing blind spots requires at least one motor or motion actuator and the adjusting devices usually include two motors.

Besides, the conventional means for exposing blind spots do not have a means to adjust or change the predetermined position. The predetermined position should vary depending on a driver's height, preferential driving posture, etc.

Accordingly, to solve the above problems, a need for a vehicle side rear-view mirror assembly having a means for exposing a blind spot and for adjusting the predetermined position has been present for a long time considering the expansive demands in the everyday life. This invention is directed to solve these problems and satisfy the long-felt need.

SUMMARY OF THE INVENTION

The present invention contrives to solve the disadvantages of the prior art. The present invention provides a vehicle side rear-view mirror assembly having a means for exposing a blind spot.

The object of the invention is to provide a vehicle side rear-view mirror assembly having a means for exposing a blind spot, which includes a mirror housing mounted on a vehicle; a support frame fixedly mounted on the vehicle; a backing plate movably connected to the support frame; a mirror glass; a connecting means which connects the mirror glass to the backing plate wherein the mirror glass is pivoted on the connecting means about a rotating axis defined by the connecting means; and a motion actuator mounted on the backing plate for rotating the mirror glass about the rotating axis,. The assembly further includes a two-motor powered adjustment means for adjusting an orientation of the backing plate in which the two-motor powered adjustment means is fixedly mounted on the support frame.

Another object of the invention is to provide a vehicle side rear-view mirror assembly having a means for exposing a blind spot in which a motion actuator of the assembly quickly rotates a mirror glass to expose blind spots and side lanes so that a driver can view the blind spots and measure the distance between the driver's vehicle and the vehicle, if any, in the blind spot through the mirror glass.

Still another object of the invention is to provide a vehicle side rear-view mirror assembly having a means for exposing a blind spot in which the motion actuator is a linear solenoid for pushing and pulling the mirror glass. The linear solenoid operates very quickly and its response time is very short.

Still another object of the invention is to provide a vehicle side rear-view mirror assembly having a means for adjusting the predetermined position. The normal position can be adjusted by using a conventional rear view rotating means. However, the present invention provide a structure to enable adjustment of the predetermined position.

The advantages of the present invention are: (1) the present invention provides a vehicle side rear-view mirror assembly having a means for exposing a blind spot which a driver is driving a vehicle; (2) the side rear-view mirror assembly of the present has a very simple structure; (3) the side rear-view mirror assembly of the present has a motion actuator which operates and rotate the mirror glass very quickly; (4) in the present invention, the orientation adjustment means and the blind spot exposing mechanism are well organized in a simple structure and can coexist without interference with other; (5) because of its simple structure, the side rear-view mirror assembly of the present invention operates very quickly, precisely and effectively; (6) the switch of the present invention is easy to use and convenient to control; and (7) the present invention provides a structure to adjust the predetermined position.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

Figure 7:
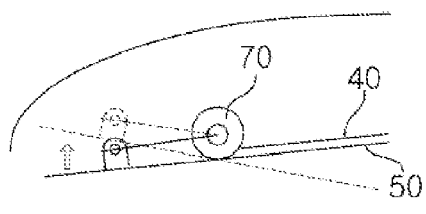
Figure 8:
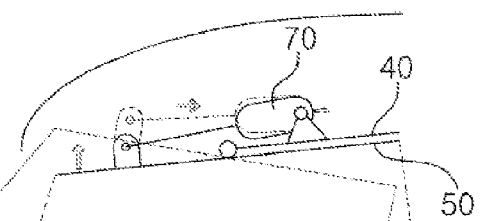
Figure 9A:
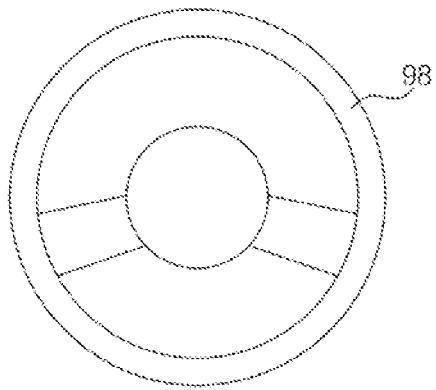
Figure 9B:
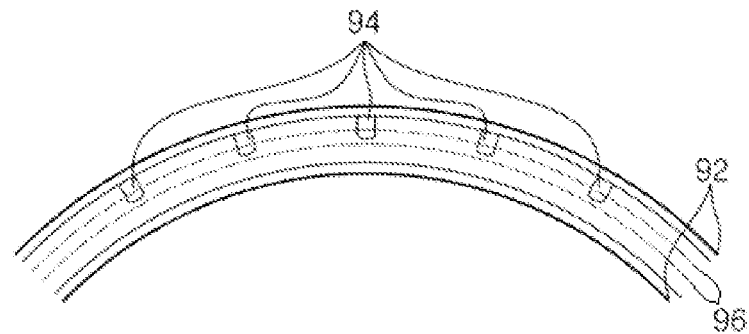
Figure 9C:
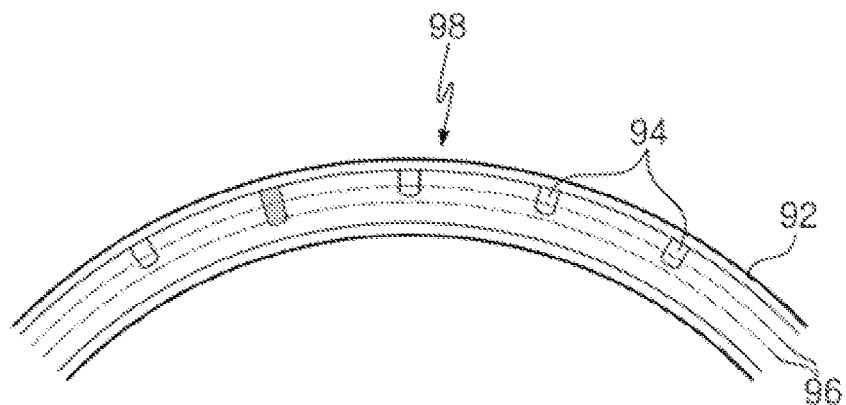
Figure 9D:
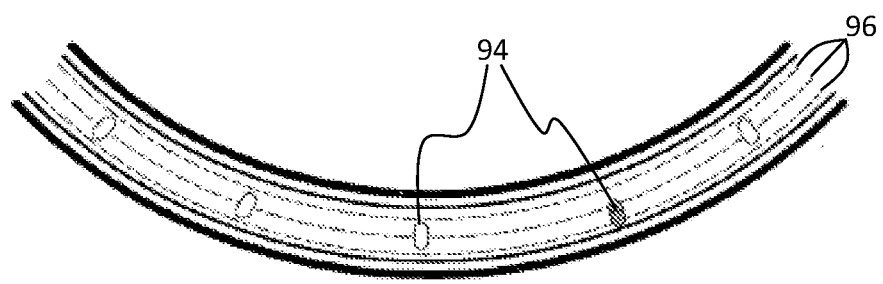

6(b), 6(c) 6(d), and 6(e) examples of degrees for which the mirror glass rotates to expose blind spots;

FIG. 7 shows another embodiment of the present invention;

FIG. 8 shows still another embodiment of the present invention; and

Figure 10A:
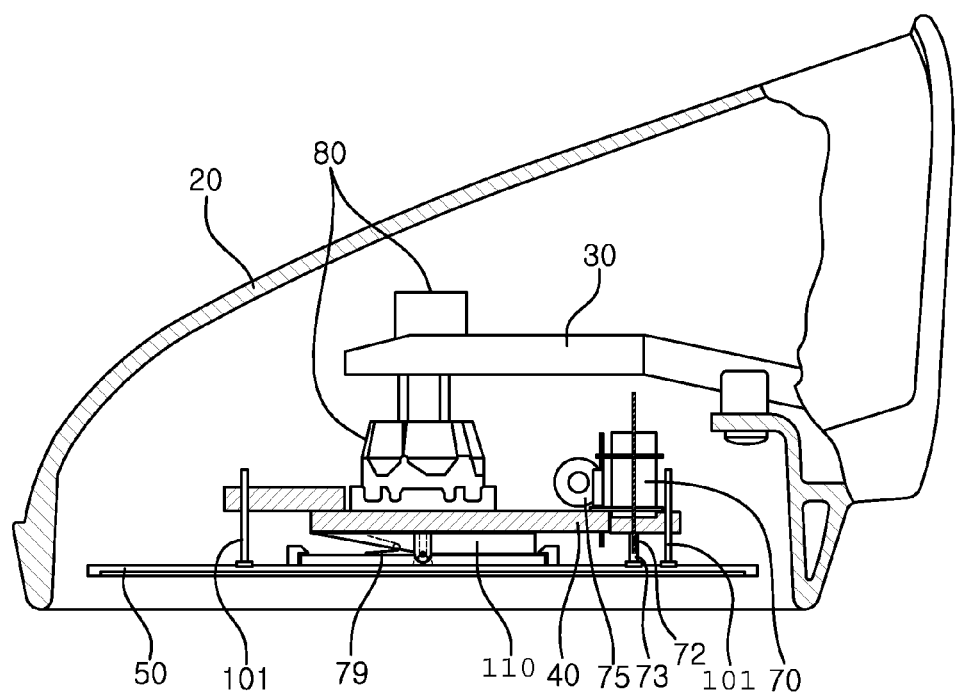
Figure 10B:
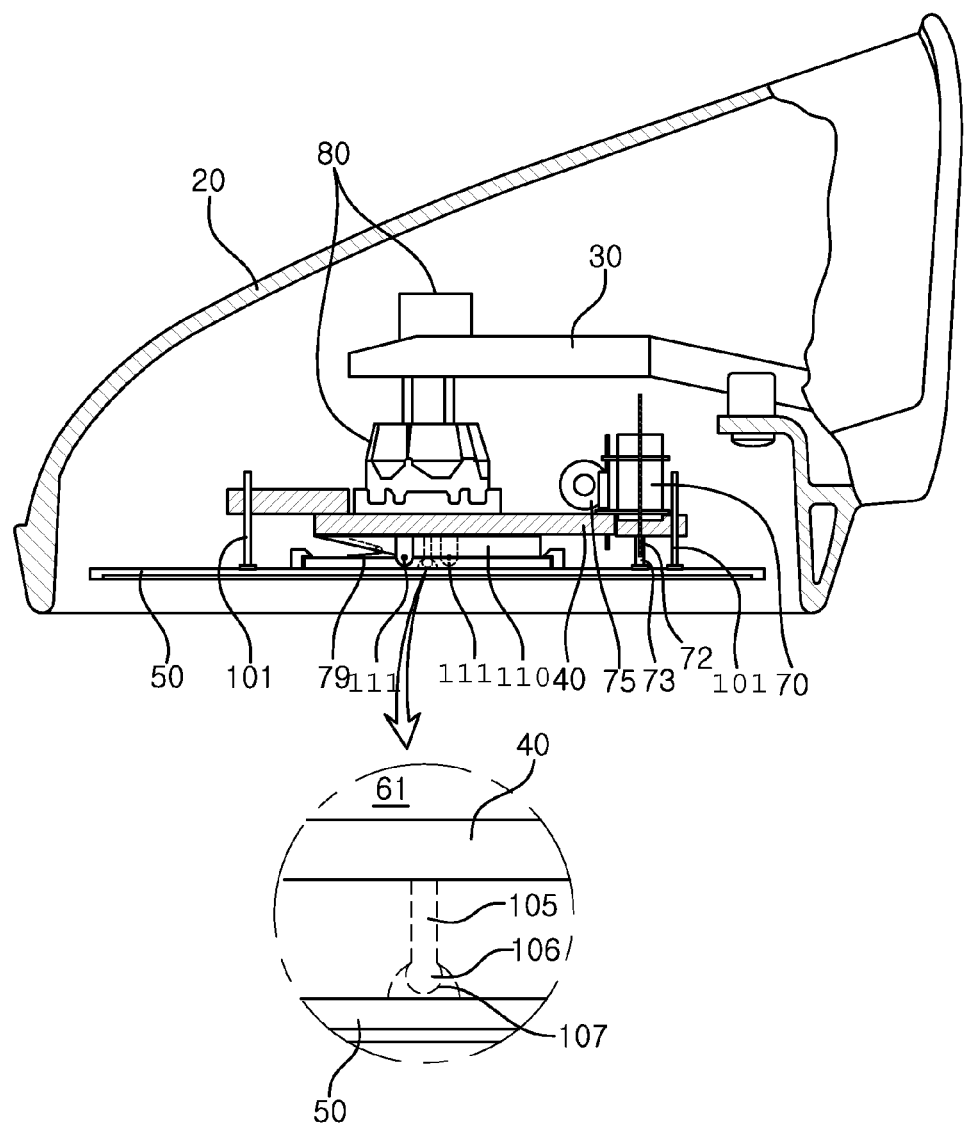
Figure 10C:
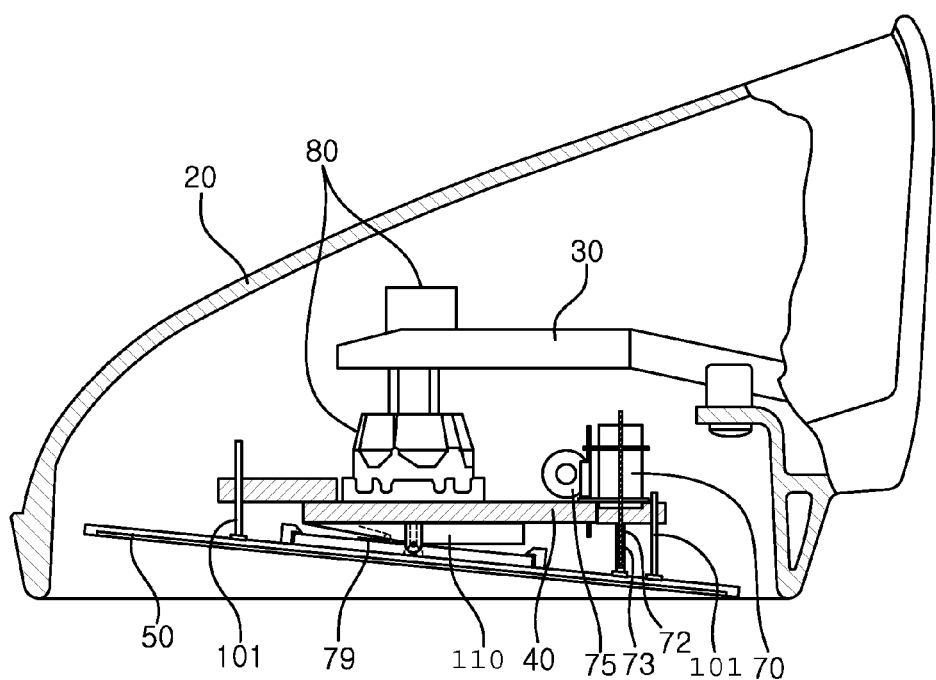

FIGS. 9(a), 9(b), 9(c) and 9(d) show a switch to activate the motion actuator according to the present invention;

FIGS. 10(a), 10(b) and 10(c) show a structure to adjust the predetermined position according to another embodiment of the present invention; and FIGS. 11(a), 11(b), 11(c), 11(d) and 11(e) show the rotating axis defining member of the means to adjust the predetermined position.

DETAILED DESCRIPTION EMBODIMENTS OF THE INVENTION

Reference will now be made in detail to the preferred embodiments of the present invention, examples of which are illustrated in the accompanying drawings.

Figure 1:
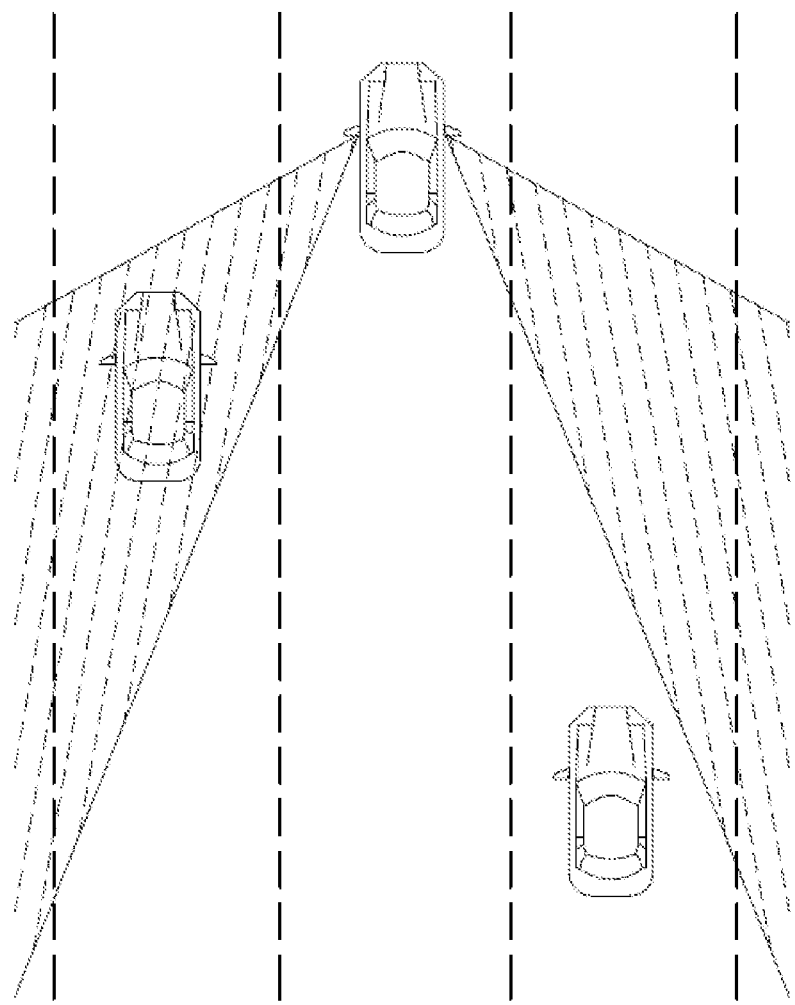
FIG. 1 shows blind spots.

FIG. 1 shows blind spots that a driver cannot view through the side rear-view mirrors without turning his head more than a minimal amount.

Figure 2:
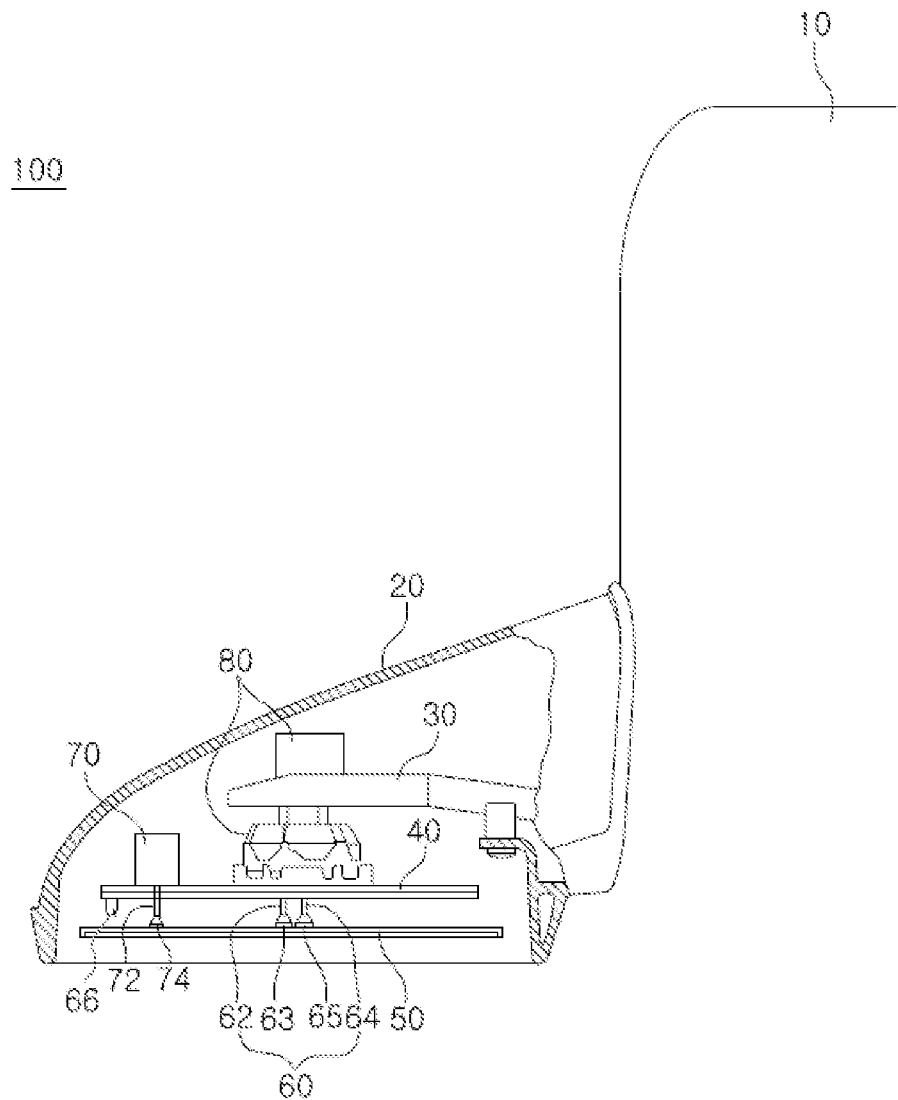
FIG. 2 shows a cross sectional view of a side rear-view mirror according to the present invention.

FIG. 2 shows is a top view, partially cutaway, of a vehicle side rear-view mirror assembly 100 having a means for exposing a blind spot according to the present invention. The vehicle side rear-view mirror assembly 100 includes a mirror housing 20 mounted on a vehicle 10; a support frame 30 fixedly mounted on the vehicle 10; a backing plate 40 movably connected to the support frame 30; a mirror glass 50 or a reflective member; a connecting means 60 which connects the mirror glass 50 to the backing plate 40 in which the mirror glass 50 is pivoted on the connecting means 60 about a rotating axis 68 which is defined by the connecting means 60; and a motion actuator 70 fixedly mounted on the backing plate 40 for rotating the mirror glass 50 about the rotating axis 68.

The mirror glass 50 generally comprises a mirror and a supporting plate fixedly attached to the back of the mirror and thus, the connecting means 60 connects the supporting plate of the mirror glass to the backing plate 40.

The vehicle side rear-view mirror of the present invention further includes a two-motor powered adjustment means 80 for adjusting an orientation of the backing plate 40 in which the two-motor powered adjustment means 80 is fixedly mounted on the support frame 30.

Conventionally, a rear-view mirror assembly generally has an orientation adjustment means which uses two motors to adjust the orientation of the rear-view mirror by horizontally and/or vertically rotating the rear-view mirror. The rear-view mirror is usually fixedly attached to a backing plate, and technically, the two motors rotate the backing plate. The orientation adjustment means is only to adjust the orientation of the rear-view mirror when a vehicle not driving, and the orientation adjustment means is not suitable for a use to expose a blind spot while driving a vehicle because the two motors rotate the rear-view mirror very slowly.

In the present invention, however, the motion actuator 70 is installed in addition to the orientation adjustment means. The orientation adjustment means is preferably a two-motor powered adjustment means 80. The motion actuator 70 operates very quickly in response to the operation of a switch 90 and it 70 is fixedly mounted on the backing plate 40. The mirror glass 50 is pivoted on both of the backing plate 40 and the motion actuator 70, and thus, when the motion actuator 70 does not operate the mirror glass 50 is fixedly mounted on the backing plate 40. Because the mirror glass 50 is fixedly mounted on the backing plate 40, the orientation of the mirror glass 50 can be adjusted by the two-motor powered adjustment means 80 when the motion actuator 70 does not operate. While driving, however, the orientation of the mirror glass 50 can be changed very quickly by the operation of the motion actuator 70 in order for a driver to view a blind spot through the mirror glass 50.

The connecting means 60 may include a first connecting rod 62 and a second connecting rod 64, and first and second joints 63, 65 are provided on an end of the first connecting rod 62 and an end of the second connecting rod 64. The first and second joints 63, 65 may be a rotating joint, a pivot joint, or a hinge joint, and they 63, 65 are preferably a ball and socket joint 63, 65. The first ball and socket joint 63 is provided on an end of the first connecting rod 62 and the second ball and socket joint 65 is provided on an end of the second connecting rod 64. The rotating axis 68 is defined by a line through the joints 63, 65 and the mirror glass 50 rotates about the rotating axis 68 by the motion actuator 70.

The first connecting rod 62 may be coupled by the first joint 63 to the mirror glass 50 and the second connecting rod 64 may be coupled by the second joint 65 to the mirror glass 50. Alternatively, the first connecting rod 62 is coupled by the first joint 63 to the backing plate 40 and the second connecting rod 64 is coupled by the second joint 65 to the backing plate 40. Accordingly, an end of a connecting rod 62, 64 is coupled to one of the mirror glass 50 and the backing plate 40, and the other end of a connecting rod 62, 64 is fixedly attached to the other of the mirror glass 50 and the backing plate 40.

Figure 3:
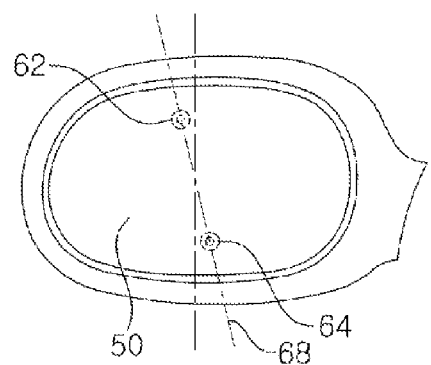
FIGS. 3 and 4 show rotating axes of the present invention for the left and right side rear-view mirrors.
Figure 4:
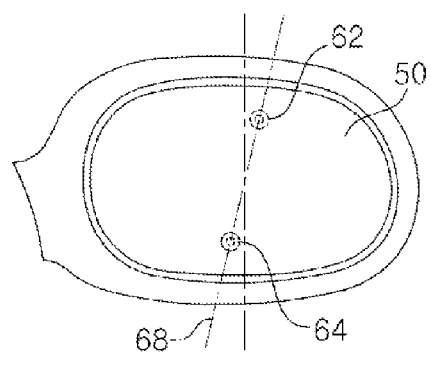

As shown in FIGS. 3 and 4, the first connecting rod 62 is disposed farther away from the vehicle 10 than the second connecting rod 64 and the first connecting rod 52 is disposed above the second connecting rod 64. By this arrangement, the rotating angle 68 is tilted outwardly relative to the vehicle 10. Preferably, the left motion actuator 70 rotates the left mirror glass 50 about 5 degrees outwardly relative to the vehicle 10 and about 5 degrees toward a bottom side, and the right motion actuator 70 rotates the right mirror glass 50 about 13 degrees outwardly relative to the vehicle 10 and about 5 degrees toward a bottom side.

In the structure as in FIGS. 2, 3 and 4, the motion actuator 70 pulls the mirror glasses 50 to expose the blind spots. Alternatively, in FIG. 2, the motion actuator 70 may be placed in the side of the vehicle 10 with respect to the rotating angle 68, and the motion actuator 70 pushes the mirror glasses 50 to expose the blind spots.

Figure 5:
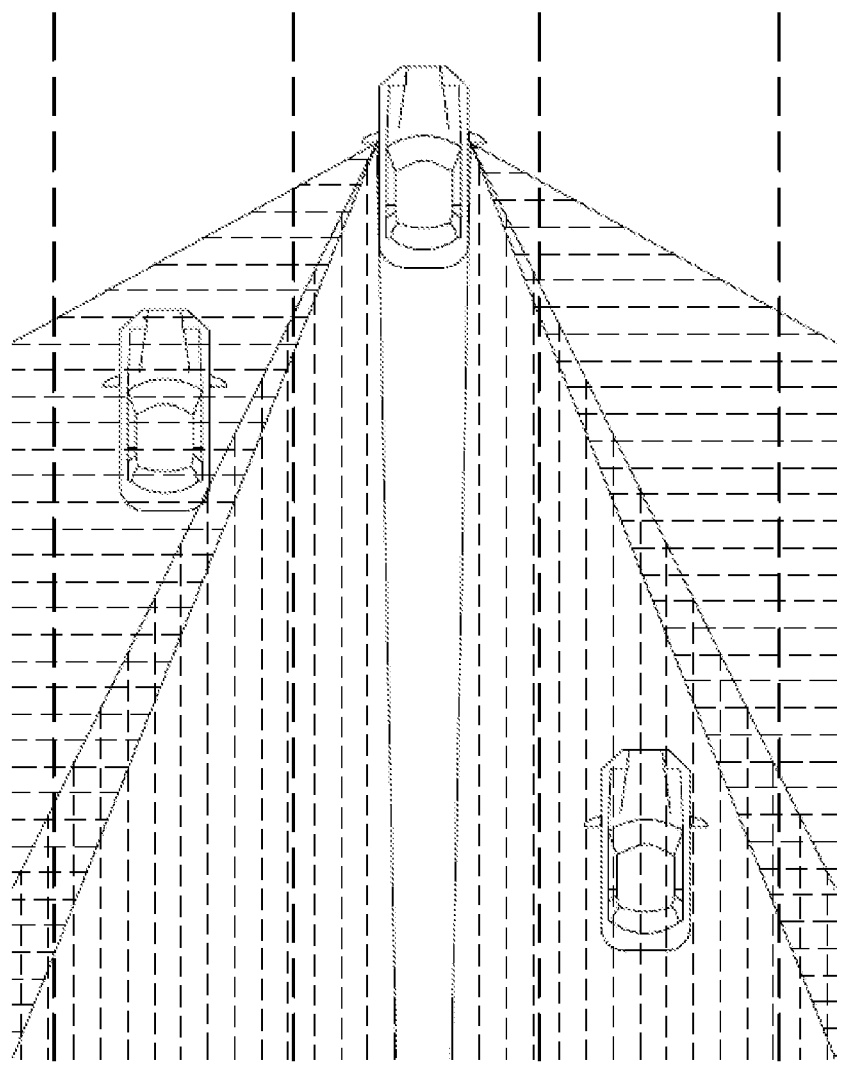
FIG. 5 shows a field of view when the motion actuator of the present invention is and is not activated.
Figure 6A:
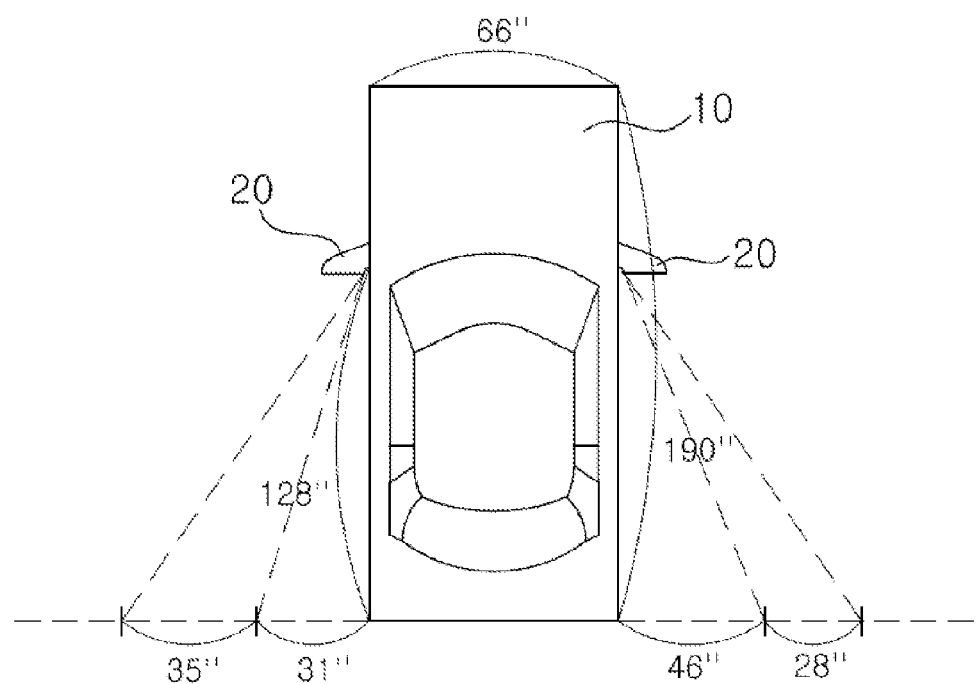
FIG. 6(a) shows an example of dimensions for the field of view when the motion actuator is and is not activated.
Figure 6B:
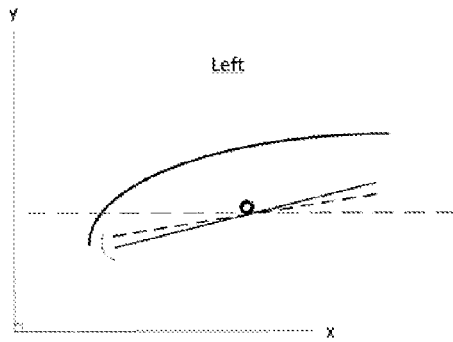
Figure 6D:
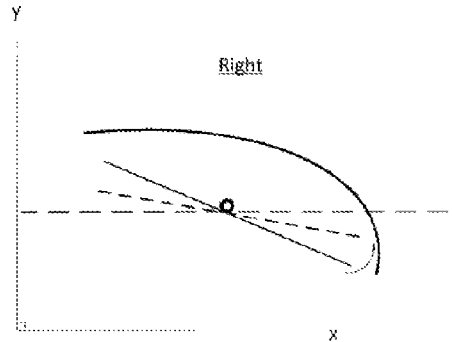
Figure 6C:
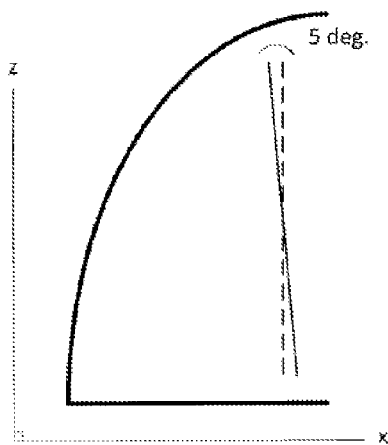
Figure 6E:
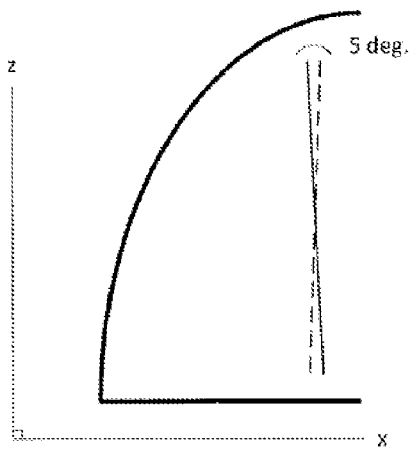

FIG. 5 shows the field of view when the motion actuator is and isn't activated.

FIGS. 6(a)-6(e) show the orientations of the mirror glass 50 on an X-Y plane and an X-Z plane before and after it 50 is rotated by the motion actuator 70. The solid lines show the orientations of the mirror glass 50 before the rotation whereas the broken lines show the orientations after the rotation.

Experiments show that what is more critical is the degree of rotation. For the left side mirror glass 50 to expose blind spots, the left side mirror glass 50 is preferably rotated about 5 degrees outwardly relative to the vertical axis-z and about 5 degrees downwardly relative to the horizontal axis-x. For the right side mirror glass 50 to expose blind spots, the left side mirror glass 50 is preferably rotated about 13 degrees outwardly relative to the vertical axis-z and about 5 degrees downwardly relative to the horizontal axis-x.

FIGS. 2, 7 and 8 show different types of the motion actuator 70. The motion actuator 70 may be a linear solenoid for pushing and pulling the mirror glass 50 and the linear solenoid 70 may comprise a thrust pin 72 which is coupled to the mirror glass 50 by a joint 74. The joint 74 may be a rotating joint, a pivot joint, a hinge joint, or a ball and socket joint, and preferably, a ball and socket joint. The linear solenoid 70 is preferable because it operates very quickly and the response time is very short.

Alternatively, the motion actuator 70 may be an electric motor 70, which is adapted to provide a linear motion, for pushing and pulling the mirror glass 50.

The motion actuator 70 may be configured to generate a rotational movement for a predetermined angle as shown in FIG. 7 and the rotational movement of the motion actuator 70 may rotate the mirror glass 50.

The motion actuator 70 may be fixedly mounted on the backing plate 40 as in FIG. 2 or pivoted to the backing plate 40 as in FIG. 8.

In FIGS. 7 and 8, the solid lines show the mirror glass 50 before it is rotated by the motion actuator 70 and the broken lines show the mirror glass 50 after it is rotated by the motion actuator 70.

The side rear-view mirror assembly 100 of the present invention may further include an abutment stop 66 to limit the rotational movement of the mirror glass 50. The abutment stop 66 is fixedly mounted on the backing plate 40 and protruded toward the mirror glass 50.

FIGS. 9(*a*)-(*c*) show a switch 90 to activate the motion actuator 70 in order to rotate the mirror glass 50. The vehicle side rear-view mirror assembly 100 further includes a switch 90, preferably installed on a steering wheel 98 of the vehicle 10 for activating the motion actuator 70 wherein if the switch 90 is on, the motion actuator 70 rotates the mirror glass 50 and if the switch 90 is off, the motion actuator 70 rotates the mirror glass 50 back to its original angle and orientation.

The switch 90 may include an outer cover 92 which covers the steering wheel 98 wherein the outer cover 92 is rotatable with respect to the steering wheel 98; a plurality of electrically conductive metal pieces 94 disposed on and attached to an inner side of the outer cover 92; and two conductive wires 96 disposed between the outer cover 92 and the steering wheel 98 along a curve of the steering wheel 98. The switch 90 is turned on when a driver rotates the outer cover 92 so that at least one conductive metal piece 94 rotates and connects the two conductive wires 96 in order for electricity to flow between the two conductive wires 96.

Generally, a vehicle has two side rear view mirrors 100. A vehicle side rear-view mirror system having a means for exposing a blind spot according to the present invention comprises a left side rear-view mirror assembly and a right side rear-view mirror assembly. The left side rear-view mirror assembly and the right side rear-view mirror assembly are substantially symmetric to each other. The vehicle side rear-view mirror system further comprises a switch 90 for activating rotational movement of the left side rear-view mirror and the right side rear-view mirror.

When a left turn signal is on, the switch 90 activates rotational movement of the left side rear-view mirror and does not activate rotational movement of the right side rear-view mirror. Furthermore, when a right turn signal is on, the switch 90 activates rotational movement of the right side rear-view mirror and does not activate rotational movement of the left side rear-view mirror. When no turn signal is on, the switch activates rotational movement of both of the left side rear-view mirror and the right side rear-view mirror.

The rotating axis 68 of the left side rear-view mirror assembly is not symmetric to the rotating axis 68 of the right side rear-view mirror assembly.

Alternatively, as in FIG. 9(*d*), there may be three conductive wires 96 of one middle conductive wire and two side conductive wires. The conductive metal pieces 94 are located along the middle conductive wire. If a driver rotates the conductive metal pieces 94 clockwise or counterclockwise and at least one metal piece 94 connects the middle conductive wire to either of the two side conductive wires, electricity flows between the two conductive wires to activate the motion actuator.

FIGS. 10(*a*), 10(*b*) and 10(*c*) show a structure to adjust the predetermined position according to another embodiment of the present invention.

The vehicle side rear-view mirror assembly 100 of the present invention comprises: a mirror housing 20 mounted on a vehicle 10; a support frame 30 fixedly mounted on the mirror housing 20 or the vehicle 10; a backing plate 40 movably connected to the support frame 30; a mirror glass 50, and a connecting means 61, which connects the mirror glass 50 to the backing plate 40. The assembly 100 further comprises a rotating axis defining member 110 for defining a rotating axis 68 and a rotating means 115 for rotating the rotating axis defining member 110. The motion actuator 70 rotates the mirror glass 50 about the rotating axis 68 from a normal position to a predetermined position.

The assembly 100 further comprises a motion actuator height adjusting means 75 for adjusting the height of the motion actuator 70 and the motion actuator height adjusting means 75 is mounted on the backing plate 40. The motion actuator 70 is height adjustably mounted on the motion actuator height adjusting means 75. By adjusting the height of the motion actuator 70, the distance between the thrust pin 72 of the motion actuator 70 and the mirror glass 50 can be adjusted.

The assembly 100 further comprises a thrust pin housing 73 for housing the thrust pin 72 wherein the thrust pin housing 73 is attached to the mirror glass 50. Preferably, the thrust pin housing 73 is cylindrical, having a cylinder bottom, and the motion actuator height adjusting means 75 moves up and down the motion actuator 70 to adjust the distance between the cylinder bottom and an end of the thrust pin 72 in the normal position. The distance between the cylinder bottom and the end of the thrust pin 72 is called a dummy distance because until the dummy distance becomes zero, even if the thrust pin 72 moves down, it does not rotate the mirror glass 50. Only after the thrust pin 72 reaches the cylinder bottom, it begins to rotate the mirror glass 50. Therefore, the longer the dummy distance, the shorter the motion actuator 70 can rotate the mirror glass 50, and vise versa. In this way, the motion actuator height adjusting means 75 can adjust the angle the mirror glass 50 can rotate by the motion actuator 70.

The connecting means 61 comprises a connecting rod 105, a rotating ball 106 and a socket 107. The rotating ball 106 is formed on an end of the connecting rod 105 and the rotating ball 106 is seated in the socket 107 to rotate therein. The connecting rod 105 is fixedly secured to the backing plate 40 and the socket 107 is fixedly secured to the mirror glass 50. Alternatively, the connecting rod 105 is fixedly secured to the mirror glass 50 and the socket 107 is fixedly secured to the backing plate 40.

The mirror glass 50 rotates about the rotating ball 106, and at the same time, the mirror glass 50 also rotates about the rotating axis 68 defined by the rotating axis defining member 110.

The rotating means 115 rotates the rotating axis defining member 110 about the connecting means 61 or more specifically, the connecting rod 105. Here, the rotating axis defining member 110 rotates independently of the backing plate 40 or the mirror glass 50. In this way, the rotating axis 68 can be modified by the rotating means 115 which rotates the rotating axis defining member 110 independently of the backing plate 40 and the mirror glass 50. The backing plate 40 and the mirror glass 50 are securely connected by the connecting means 61, and thus, the rotating axis defining member 110 can rotate independently of the backing plate 40 and the mirror glass 50.

The assembly 100 may further comprise a connecting bar 101 which moves up and down as shown in FIGS. 10(a)-10(c) by the mirror glass 50 rotating by the thrust pin 72 or the spring 79. The connecting bar 101 prevents the mirror glass 50 from rotating along with the rotating axis defining member 110 when the rotating axis defining member rotates by the rotating means 115. There may be only one connecting bar 101 or more than one connecting bar 101. Two connecting bars 101 are preferable.

Figure 11A:
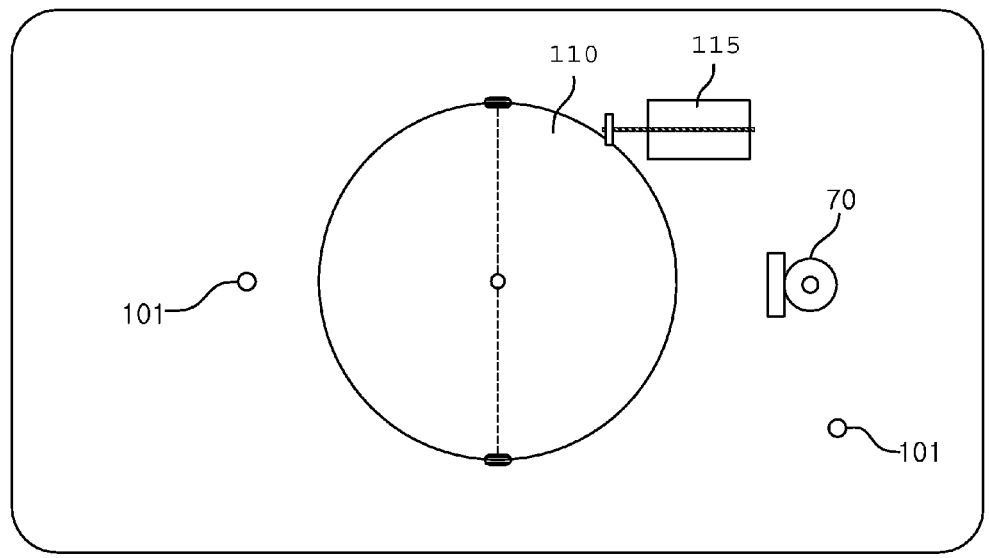
Figure 11B:
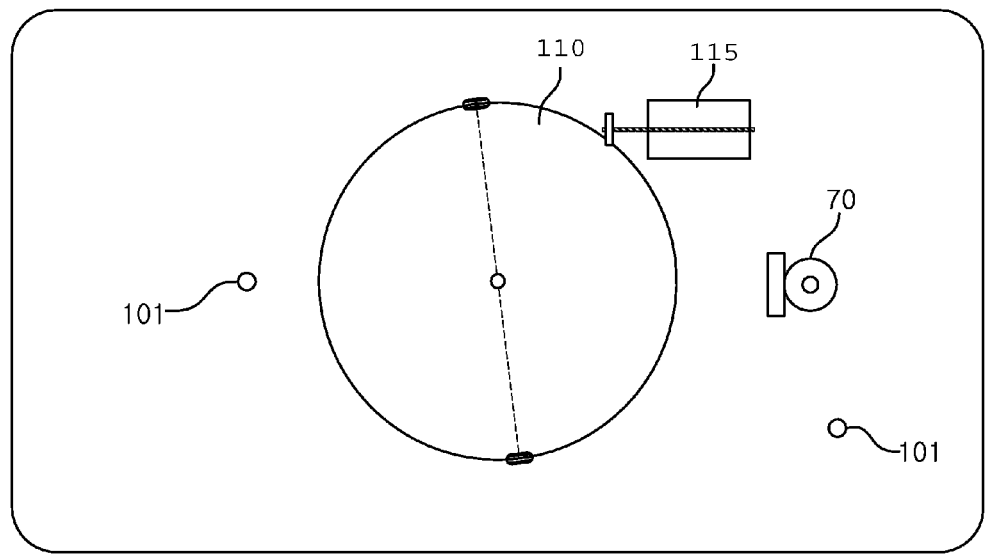
Figure 11C:
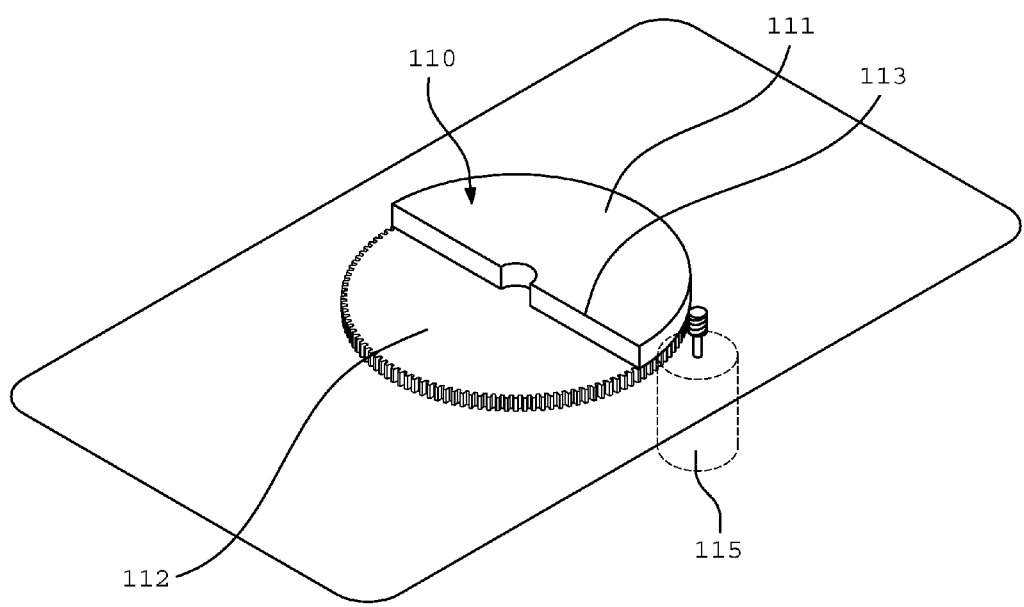
Figure 11D:
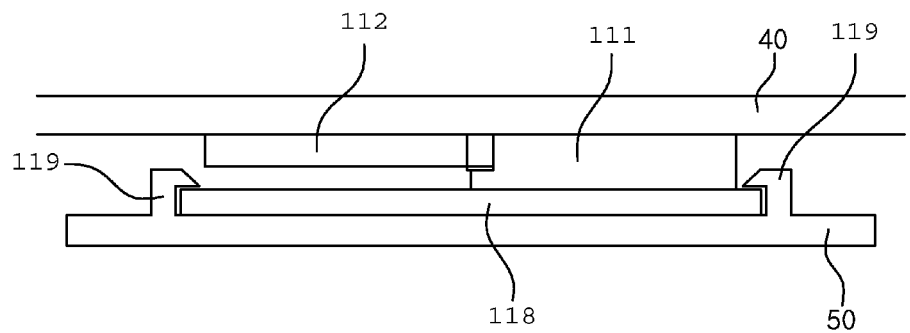
Figure 11E:
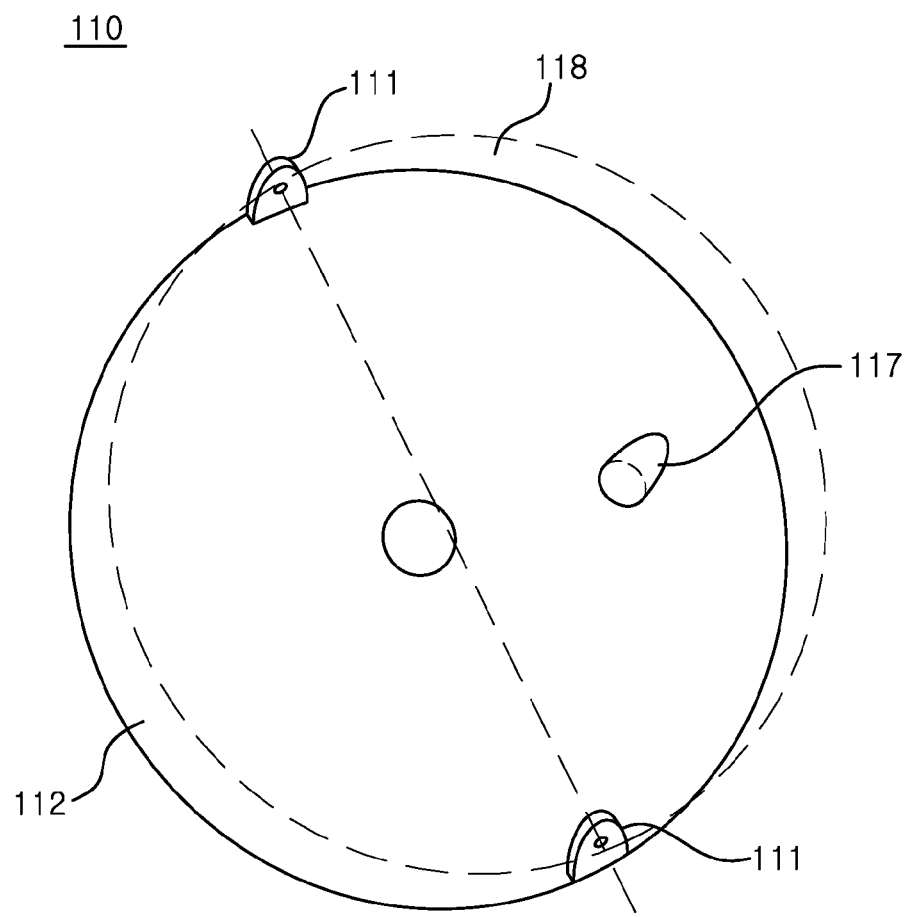

FIGS. 11(a), 11(b), 11(c), 11(d) and 11(e) show the rotating axis defining member 110. The rotating axis defining member 110 comprises a base 112 and a pivot line defining member 111, and the pivot line defining member 111 is configured to define the rotating axis 68. The rotating axis defining member 110 is configured to rotate about the connecting rod 105 independently of the backing plate 40 or the mirror glass 50. Preferably, the base 112 is circular and a worm wheel is formed on its boundary as shown in FIG. 11(c), and the rotating means 115 comprises a worm gear to rotate the worm wheel of the base 112.

The rotating axis defining member 110 further comprises a circular rotating plate 118 which is configured to rotate about the rotating axis 68. The circular rotating plate 118 is attached to the mirror glass 50 by a holding member 119 and configured to rotate independently of the mirror glass 50. The mirror glass 50 is pivotably attached to the connecting means 61 and the connecting means 61 is fixedly attached to the backing plate 40. The circular rotating plate 118 has a through hole at its center through which the connecting means 61 can pass. The base 112 also has a through hole at its center through which the connecting means 61 can pass.

The pivot line defining member 111 comprises a pivot line 113 and a mirror glass contact portion 117. The mirror glass 50 is in contact with the mirror glass contact portion 117 of the pivot line defining member 111 during the normal position. In FIG. 11(c), the flat semi-circular surface of the pivot line defining member 111 is the mirror glass contact portion 117. Alternative, a protrusion as in FIG. 11(e) may play as a mirror glass contact portion 117.

The assembly 100 may further comprise a spring 79 which is associated with the mirror glass to bias the mirror glass toward the normal position. Preferably, the spring 79 is biased against the backing plate 40.

The motion actuator 70 is a linear solenoid for pushing and pulling the mirror glass, comprising a thrust pin 72, and the motion actuator 70 is located closer to the vehicle 10 than the connecting means 61. Alternatively, the motion actuator 70 may be located farther than the connecting means 61.

The assembly 100 may further comprises a two-motor powered adjustment means 80 for adjusting an orientation of the backing plate 40 wherein the two-motor powered adjustment means 80 is fixedly mounted on the support frame 30.

The two-motor powered adjustment means 80 adjusts the normal position and has a first switch to rotate the backing plate upward view or downward view direction and a second switch to rotate the backing plate rightward view or leftward view direction. These first and second switches are currently widely used. When the switch 90 is off, the first and second switches are activated for adjusting the normal position by the first switch rotating the backing plate to a upward view or downward view direction and the second switch rotating the backing plate to a rightward view or leftward view direction. When the switch 90 is on, the first and second switches are activated for adjusting the predetermined position by the first switch activating the rotating means 115 and the second switch activating the motion actuator height adjusting means 75.

The switch 90 of the present invention may be used to operate a visual blind spot monitoring system. The switch 90 may turn on a screen for digitally displaying the blind spot. The blind spot may be filmed by digital cameras installed on both sides of a vehicle and displayed on a screen by the operation of the switch 90.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A vehicle side rear-view mirror assembly having a means for exposing a blind spot, comprising:
    a mirror housing mounted on a vehicle;
    a support frame fixedly mounted on the mirror housing or the vehicle;
    a backing plate movably connected to the support frame;
    a mirror glass;
    a connecting means which connects the mirror glass to the backing plate;
    a rotating axis defining member for defining a rotating axis;
    a rotating means for rotating the rotating axis defining member;
    a motion actuator for rotating the mirror glass about the rotating axis from a normal position to a predetermined position; and
    a motion actuator height adjusting means for adjusting a height of the motion actuator, the motion actuator height adjusting means mounted on the backing plate, wherein the motion actuator is height adjustably mounted on the motion actuator height adjusting means.

2. The vehicle side rear-view mirror assembly of claim 1, wherein the connecting means comprises a connecting rod, a rotating ball and a socket wherein the rotating ball is seated in the socket.

3. The vehicle side rear-view mirror assembly of claim 2, wherein the connecting rod is fixedly secured to the backing plate and the socket is fixedly secured to the mirror glass.

4. The vehicle side rear-view mirror assembly of claim 2, wherein the connecting rod is fixedly secured to the mirror glass and the socket is fixedly secured to the backing plate.

5. The vehicle side rear-view mirror assembly of claim 2, wherein the mirror glass rotates about the rotating ball and the rotating axis defined by the rotating axis defining member.

6. The vehicle side rear-view mirror assembly of claim 2, wherein the rotating means rotates the rotating axis defining member about the connecting rod.

7. The vehicle side rear-view mirror assembly of claim 2, wherein the rotating axis defining member comprises a base and a pivot line defining member, and the pivot line defining member defines the rotating axis, and wherein the rotating axis defining member is configured to rotate about the connecting rod independently of the backing plate or the mirror glass.

8. The vehicle side rear-view mirror assembly of claim 7, wherein the base is circular and a worm wheel is formed on a boundary of the base, and wherein the rotating means comprises a worm gear to rotate the worm wheel.

9. The vehicle side rear-view mirror assembly of claim 7, wherein the rotating axis defining member further comprises a circular rotating plate which is configured to rotate about the rotating axis, and wherein the circular rotating plate is attached to the mirror glass by a holding member and configured to rotate independently of the mirror glass.

10. The vehicle side rear-view mirror assembly of claim 7, wherein the pivot line defining member comprises a pivot line and a mirror glass contact portion, and wherein the mirror glass is in contact with the mirror glass contact portion of the pivot line defining member during the normal position.

11. The vehicle side rear-view mirror assembly of claim 1, wherein a spring is associated with the mirror glass to bias the mirror glass toward the normal position.

12. The vehicle side rear-view mirror assembly of claim 1, wherein the motion actuator is a linear solenoid for pushing and pulling the mirror glass, comprising a thrust pin.

13. The vehicle side rear-view mirror assembly of claim 12, wherein the motion actuator is located closer to the vehicle than the connecting means.

14. The vehicle side rear-view mirror assembly of claim 13, further comprising a thrust pin housing for housing the thrust pin wherein the thrust pin housing is attached to the mirror glass wherein the thrust pin housing is cylindrical, having a cylinder bottom, and wherein the motion actuator height adjusting means moves up and down the motion actuator to adjust a distance between the cylinder bottom and an end of the thrust pin in the normal position.

15. The vehicle side rear-view mirror assembly of claim 1, further comprising a two-motor powered adjustment means for adjusting an orientation of the backing plate wherein the two-motor powered adjustment means is fixedly mounted on the support frame.

16. The vehicle side rear-view mirror assembly of claim 1, further comprising a switch installed on a steering wheel of the vehicle for activating the motion actuator wherein if the switch is on, the motion actuator rotates the mirror glass from the normal position to the predetermined position and if the switch is off, the motion actuator rotates the mirror glass back to the normal position.

17. The vehicle side rear-view mirror assembly of claim 16, wherein the switch comprises:

an outer cover which covers the steering wheel wherein the outer cover is rotatable with respect to the steering wheel;
a plurality of electrically conductive metal pieces disposed on and attached to an inner side of the outer cover; and
two conductive wires disposed between the outer over and the steering wheel along a curve of the steering wheel;
wherein the switch is turned on when a driver rotates the outer cover so that at least one conductive metal piece rotates and connects the two conductive wires in order for electricity to flow between the two conductive wires.

18. The vehicle side rear-view mirror assembly of claim 16, wherein the switch comprises
an outer cover which covers the steering wheel wherein the outer cover is rotatable with respect to the steering wheel;
a plurality of electrically conductive metal pieces disposed on and attached to an inner side of the outer cover; and
three conductive wires disposed between the outer cover and the steering wheel along a curve of the steering wheel;
wherein the switch is turned on when a driver rotates the outer cover so that at least one conductive metal piece. rotates and connects two conductive wires in order for electricity to flow between the two conductive wires.

19. The vehicle side rear-view mirror assembly of claim 16, wherein the three conductive wires comprises a middle conductive wire and two side conductive wires, and
wherein the switch is turned on when a driver rotates the outer cover so that at least one conductive metal piece rotates and connects the middle conductive wire to either of the two side conductive wires in order for electricity to flow between the connected conductive wires.

20. The vehicle side rear-view mirror assembly of claim 16, further comprising a two-motor powered adjustment means for adjusting the normal position having a first switch to rotate the backing plate upward view or downward view direction and a second switch to rotate the backing plate rightward view or leftward view direction,
wherein when the switch is off, the first and second switches are activated for adjusting the normal position by the first switch rotating the backing plate to a upward view or downward view direction and the second switch rotating the backing plate to a rightward view or leftward view direction,
wherein when the switch is on, the first and second switches are activated for adjusting the predetermined position by the first switch activating the rotating means and the second switch activating the motion actuator height adjusting means.

\* \* \* \* \*